US012095414B1

United States Patent
Duan et al.

(10) Patent No.: US 12,095,414 B1
(45) Date of Patent: Sep. 17, 2024

(54) DEVICE FOR PHOTOVOLTAIC POWER GENERATION AND METHOD THEREFOR

(71) Applicant: Institute of Process Engineering, Chinese Academy of Sciences, Beijing (CN)

(72) Inventors: Dongping Duan, Beijing (CN); Qibo Jia, Beijing (CN); Siming Chen, Beijing (CN); Xiaodong Zhang, Beijing (CN); Ke Gan, Beijing (CN); Yuzhi Ren, Beijing (CN)

(73) Assignee: Institute of Process Engineering, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/424,301

(22) Filed: Jan. 26, 2024

(30) Foreign Application Priority Data

May 10, 2023 (CN) .......................... 202310517840.4

(51) Int. Cl.
*H02S 40/22* (2014.01)
*H01G 9/20* (2006.01)

(52) U.S. Cl.
CPC .......... *H02S 40/22* (2014.12); *H01G 9/2013* (2013.01)

(58) Field of Classification Search
CPC .... H02S 40/22; H01G 9/2013; B01J 2523/24; B01J 23/464
See application file for complete search history.

(56) References Cited

U.S. PATENT DOCUMENTS

2015/0214411 A1 7/2015 Guerra

FOREIGN PATENT DOCUMENTS

| CN | 101795099 A | 8/2010 |
| CN | 103887069 A | 6/2014 |
| CN | 105226109 A | 1/2016 |

(Continued)

OTHER PUBLICATIONS

English Machine Translation of CN-112604678-A (Year: 2021).*

(Continued)

*Primary Examiner* — Kourtney R S Carlson
(74) *Attorney, Agent, or Firm* — George R. McGuire; Bond Schoeneck & King PLLC (57) ABSTRACT

Provided are a device for photovoltaic power generation and a method therefor. The device for photovoltaic power generation comprises a photovoltaic power generating reactor comprising a light-transmitting surface, a light condenser component and an external electric field system; the light condenser component comprises a solar concentrating cone and a reflector for reflecting sunlight onto the solar concentrating cone; the solar concentrating cone has a light-concentrating surface facing the light-transmitting surface of the photovoltaic power generating reactor; the external electric field system comprises a positive electric field metal plate and a negative electric field metal plate, the positive electric field metal plate is arranged between the photovoltaic power generating reactor and the solar concentrating cone, and the negative electric field metal plate is arranged at the bottom of the photovoltaic power generating reactor; and the photovoltaic power generating reactor is arranged with a photoelectric conversion material inside.

7 Claims, 1 Drawing Sheet

(56) References Cited

FOREIGN PATENT DOCUMENTS

| | | |
|---|---|---|
| CN | 106105022 A | 11/2016 |
| CN | 107552049 A | 1/2018 |
| CN | 112604678 A | 4/2021 |

OTHER PUBLICATIONS

English Machine Translation of CN-103887069-A (Year: 2014).*
English Machine Translation of CN-101795099-A (Year: 2010).*
English Machine Translation of CN-106105022-A (Year: 2016).*
Translated Chinese First Office Action, App. No. 202310517840.4, dated Jun. 8, 2023.
Translated Chinese Second Office Action, App. No. 202310517840.4, dated Jul. 15, 2023.
Liu Jing et. al, Indoor Air Pollution Control, China University of Mining and Technology Press, Dec. 2012, ISBN 978-7-5646-1722-6, pp. 1-5.

* cited by examiner

DEVICE FOR PHOTOVOLTAIC POWER GENERATION AND METHOD THEREFOR

CROSS-REFERENCE TO RELATED APPLICATION(S)

This application claims priority to Chinese Patent Application No. 202310517840.4 filed May 10, 2023, the disclosure of which is incorporated herein by reference in its entirety.

TECHNICAL FIELD

The present application belongs to the field of photovoltaic power generation, and specifically relates to a device for photovoltaic power generation and a method therefor.

BACKGROUND

Photovoltaic power generation technology, which directly converts solar energy into electricity, is mainly based on the photovoltaic effect at the semiconductor interface to directly converts light energy into electricity.

The key component of photovoltaic power generation technology is the solar cell. The development of the solar cell can be divided into three stages.

1. The first generation of photovoltaic power generation technology: the first generation refers to crystalline silicon photovoltaic power generation, including monocrystalline silicon and polycrystalline silicon, which currently is the most widely used solar power generation technology.

2. The second generation of photovoltaic power generation technology: the second generation refers to thin-film cells, the main species of which include silicon thin-film cells such as amorphous silicon thin-film cells, nanocrystalline silicon thin-film cells and microcrystalline silicon thin-film cells, thin-film cells composed of copper, indium, gallium, and selenium, perovskite thin-film cells, etc. For example, CN208062063U discloses a hybrid photovoltaic power generation system employing a crystalline silicon cell and a copper indium gallium selenide thin-film cell, which comprises a crystalline silicon cell module and a copper indium gallium selenide thin-film cell module; the crystalline silicon cell module is composed of polycrystalline silicon cells or monocrystalline silicon cells with series-parallel connection, and the copper indium gallium selenide thin-film cell module is composed of copper indium gallium selenide thin-film cells with series-parallel connection; the crystalline silicon cell module and the copper indium gallium selenide thin-film cell module are connected in series or parallel to form a photovoltaic power generation unit; the photovoltaic power generation unit is collocated with an energy storage device, a photovoltaic controller and an off-grid power supply to form an independent off-grid power generation system with energy storage capability, or collocated with a convergence device and a grid-connected inverter to form a grid-connected distributed power generation system. CN110875399B discloses a thin-film solar cell with broad-spectrum absorption and a device for photovoltaic power generation; the thin-film solar cell comprises a front electrode layer, a light absorption layer, a back electrode layer, and a substrate layer, wherein the front electrode layer is dispersed with non-metallic micro-nano spheres on its surface facing away from the light absorption layer, and the micro-nano spheres have a radius of 15 nm-150 nm; the back electrode layer is dispersed with metallic micro-nano hemispheres inside, the micro-nano hemispheres have a radius of 25 nm-250 nm, and the distance between the micro-nano hemispheres and the light absorption layer is 10 nm-100 nm. The device for photovoltaic power generation comprises a solar cell module, a controller, a storage battery pack, and a DC-AC inverter, and the solar cell module comprises a plurality of electrically connected thin-film solar cells. CN115411125A discloses a thin-film solar cell and a preparation method therefor, a photovoltaic module, and a power generation device; the thin-film solar cell comprises a transparent substrate, and a first conductive layer, a first light conversion layer, and a second conductive layer which are sequentially arranged on one side of the transparent substrate, and a light-trapping structure and a second light conversion layer which are sequentially arranged on the other side of the transparent substrate; light of a second wavelength range is absorbed by the second light conversion layer and converted into the light of a first wavelength range, and the light of a first wavelength range is directly transmitted through the second light conversion layer; both the light adjusted by the light-trapping structure and the light of a first wavelength range passing across the light-trapping structure transmitted to the first light conversion layer and is absorbed thereby. Although the photoelectric conversion efficiency has been greatly improved, this structure only receives low solar energy and absorbs single solar light intensity per unit area; there is little space for improvement in photoelectric conversion efficiency, which restricts the performance of photovoltaic materials with high potential of photoelectric conversion efficiency. Meanwhile, the silicon based photovoltaic material requires high-temperature process to be prepared and the cost is high; with regard to the currently popular organic or perovskite based photovoltaic material, the product scaling is a great challenge, and the product has poor stability, which is vulnerable to the erosion of water and oxygen and in turn reduce the performance of photovoltaic conversion.

3. The third generation of photovoltaic power generation technology refers to the concentrating power generation technology; according to Einstein's photoelectric equation, the generated energy is proportional to the light intensity, which means more energy can be generated by concentrating the light. Uniform light concentration, called adaptive optics without optical aberrations, is a new technology developed in recent years, and by such light concentration, the conversion efficiency of cells can be greatly improved. However, such light-concentrating power generation technology is not applicable to the current mature photovoltaic cell materials, such as monocrystalline silicon, polycrystalline silicon, and perovskite materials. Moreover, mature products based on the light-concentrating power generation technology have not been born yet.

Therefore, it is of urgent technical challenge to utilize the design concept of light-concentrating power generation to realize photoelectric conversion and obtain high photoelectric conversion efficiency.

SUMMARY

The present application is to provide a device for photovoltaic power generation and a method therefor. In the present application, a device for concentrating photovoltaic power generation is designed by utilizing the design concept of light-concentrating power generation, which greatly improves the utilization efficiency and light intensity of sunlight and largely simplifies the photoelectric conversion interface and the reaction unit, and by using a novel photoelectric conversion material, the photoelectric conversion efficiency is significantly improved. The device is simple in construction, low in cost, suitable for a variety of terrains as well as a variety of sunlight conditions, and has the potential for industrialized application.

In a first aspect, the present application provides a device for photovoltaic power generation, and the device for photovoltaic power generation comprises a photovoltaic power generating reactor comprising a light-transmitting surface, a light condenser component and an external electric field system;

wherein the light condenser component comprises a solar concentrating cone and a reflector for reflecting sunlight onto the solar concentrating cone;

the solar concentrating cone has a light-concentrating surface facing the light-transmitting surface of the photovoltaic power generating reactor;

the external electric field system comprises a positive electric field metal plate and a negative electric field metal plate, the positive electric field metal plate is arranged between the photovoltaic power generating reactor and the solar concentrating cone, and the negative electric field metal plate is arranged at the bottom of the photovoltaic power generating reactor; and the photovoltaic power generating reactor is arranged with a photoelectric conversion material inside.

In the present application, a device for concentrating photovoltaic power generation is designed by utilizing the design concept of light-concentrating power generation, which greatly improves the utilization efficiency and light intensity of sunlight and largely simplifies the photoelectric conversion interface and the reaction unit, and by using a novel photoelectric conversion material, the photoelectric conversion efficiency is significantly improved. The device is simple in construction, low in cost, suitable for a variety of terrains as well as a variety of sunlight conditions, and has the potential for industrialized application.

In the present application, the external electric field system is used for directional export of electrons to enhance the photoelectric conversion efficiency.

In the present application, there is no limitation on the material of the light condenser component; for example, the solar concentrating cone may be made of aluminum boards, and the reflector may be made of aluminum boards. In the present application, there is no limitation on the source of the external electric field system, which may be a commercially available circuit system of solar photovoltaic cell.

In the present application, there is no limitation on the inner wall of the photovoltaic power generating reactor; for example, the inner wall of the photovoltaic power generating reactor may be covered with an aluminum foil; there is no limitation on the size of the photovoltaic power generating reactor; for example, the photovoltaic power generating reactor may be a reactor with a light-exposed area of 6×6 cm2 or a reactor with a diameter of light-exposed surface of 1-2 m.

As a preferred technical solution of the present application, the solar concentrating cone is arranged directly above the photovoltaic power generating reactor.

Preferably, the solar concentrating cone is selected from a concentrating mirror.

Preferably, a number of reflectors is 10-100000, which may be, for example, 10, 100, 200, 300, 400, 500, 600, 700, 800, 900, 1000, 10000, 30000, 40000 or 100000. However, the number is not limited to the listed values, and other unlisted values within the numerical range are also applicable.

Preferably, the reflectors are evenly arranged around the photovoltaic power generating reactor.

In the present application, by arranging 10-100000 reflectors, the sunlight can be concentrated and reach 10-100000 times the standard solar irradiance in light intensity, which greatly improves the utilization efficiency and light intensity of sunlight and also largely simplifies the photoelectric conversion interface and the reaction unit, which is beneficial for efficient photoelectric conversion.

As a preferred technical solution of the present application, an applied voltage of the external electric field system is 110-4000 V, which may be, for example, 110 V, 130 V, 150 V, 170 V, 190 V, 210 V, 220 V, 500 V, 1000 V, 2000 V, 3000 V or 4000 V, and preferably 110-220 V.

In the present application, the electric field intensity can be controlled by controlling the applied voltage of the electric field. If the applied voltage is too small, electrons will be difficult to export, and the photoelectric conversion efficiency will be low; if the applied voltage is too large, electrons and holes are prone to recombination, and the photoelectric conversion efficiency will be low.

Preferably, materials of the positive electric field metal plate and the negative electric field metal plate are independently selected from any one of copper, steel or aluminum.

Preferably, a ratio of a distance between the positive electric field metal plate and a top surface of the photovoltaic power generating reactor to a distance between the negative electric field metal plate and a bottom surface of the photovoltaic power generating reactor is 1:(1-3), which may be, for example, 1:1, 1:1.5, 1:2, 1:2.5 or 1:3.

As a preferred technical solution of the present application, the photovoltaic power generating reactor has an integral structure, the photovoltaic conversion material is inlaid on at least one side of inner walls of the photovoltaic power generating reactor, and preferably, the photovoltaic conversion material is inlaid on the top of inner walls of the photovoltaic power generating reactor;

or, the photovoltaic power generating reactor comprises a container with an opening at the top and a light-transmitting cover arranged at the opening, and the photovoltaic conversion material is inlaid on at least one side of inner walls of the container or inlaid on an inner surface of the light-transmitting cover close to the container.

Preferably, a material of the light-transmitting cover is quartz glass.

Preferably, a stirrer is arranged near the bottom of the photovoltaic power generating reactor.

As a preferred technical solution of the present application, the photoelectric conversion material comprises a polyhedron strontium titanate catalyst and/or a polyhedron strontium titanate composite catalyst.

It is to be noted that the polyhedron strontium titanate catalyst is pure polyhedron strontium titanate without a co-catalyst, and the polyhedron strontium titanate composite catalyst is a composite of polyhedron strontium titanate and a co-catalyst.

Preferably, the polyhedron strontium titanate catalyst comprises an octadecahedron strontium titanate catalyst and/or a polyhedron strontium titanate catalyst having twenty-six faces.

In the present application, strontium titanate is a photocatalytic material with high temperature resistance and high ultraviolet absorption efficiency, having suitable band gap, valence band, and conduction band values. By loading the co-catalyst as active sites, the separation efficiency of photoelectrons and photoholes can be further improved, and the photoelectric conversion efficiency can be improved. Therefore, the use of polyhedron strontium titanate for photoelectric conversion can effectively improve the photoelectric conversion efficiency by fully utilizing the unique photoelectric conversion performance of polyhedron strontium titanate.

Preferably, the polyhedron strontium titanate composite catalyst is loaded with a Rh metal compound and a Co metal compound as co-catalysts.

Preferably, the polyhedron strontium titanate composite catalyst comprises an octadecahedron strontium titanate composite catalyst and/or a polyhedron strontium titanate composite catalyst having twenty-six faces.

As a preferred technical solution of the present application, a preparation method for the polyhedron strontium titanate composite catalyst comprises the following steps:
(1) mixing strontium titanate and strontium halide, and performing heat treatment to obtain a polyhedron strontium titanate catalyst; and
(2) preparing the polyhedron strontium titanate composite catalyst by a stepwise photodeposition method, wherein the stepwise photodeposition method comprises the following specific steps:
(a) mixing a rhodium source solution and the polyhedron strontium titanate catalyst, and performing irradiation to obtain a first mixture;
(b) mixing a cobalt source solution and the first mixture, and performing irradiation to obtain a second mixture; and
(c) performing heat treatment on the second mixture to obtain the polyhedron strontium titanate and its composite catalyst.

As a preferred technical solution of the present application, a mass ratio of the strontium titanate to the strontium halide in step (1) is 1:(2-6), which may be, for example, 1:2, 1:2.5, 1:3, 1:3.5, 1:4, 1:4.5, 1:5, 1:5.5 or 1:6. However, the mass ratio is not limited to the listed values, and other unlisted values within the numerical range are also applicable.

In the present application, if the mass ratio of strontium titanate to strontium halide is too small, i.e., the amount of strontium halide is too large, the obtained polyhedron strontium titanate will have an ununiform particle size distribution and an irregular morphology; if the mass ratio of strontium titanate to strontium halide is too large, i.e., the amount of strontium halide is too small, the polyhedron strontium titanate will have a low conversion rate and an irregular morphology.

Preferably, the strontium halide in step (1) comprises any one or a combination of at least two of strontium chloride, strontium bromide or strontium iodide.

Preferably, the heat treatment in step (1) is performed at a temperature of 800-1200° C., which may be, for example, 800° C., 850° C., 900° C., 950° C., 1000° C., 1050° C., 1100° C., 1150° C. or 1200° C. However, the temperature is not limited to the listed values, and other unlisted values within the numerical range are also applicable.

Preferably, the heat treatment in step (1) is performed for a period of 5-10 h, which may be, for example, 5 h, 6 h, 7 h, 8 h, 9 h or 10 h. However, the period is not limited to the listed values, and other unlisted values within the numerical range are also applicable.

As a preferred technical solution of the present application, a rhodium source of the rhodium source solution in step (a) comprises rhodium chloride.

Preferably, a cobalt source of the cobalt source solution in step (b) comprises cobalt nitrate.

Preferably, concentrations of the rhodium source solution and the cobalt source solution are independently 2-4 mg/mL, which may be, for example, 2 mg/mL, 2.2 mg/mL, 2.4 mg/mL, 2.6 mg/mL, 2.8 mg/mL, 3 mg/mL, 3.2 mg/mL, 3.4 mg/mL, 3.6 mg/mL, 3.8 mg/mL or 4 mg/mL. However, the concentration is not limited to the listed values, and other unlisted values within the numerical range are also applicable.

It is to be noted that, in the present application, the "independently" means that the rhodium source solution has a concentration of 2-4 mg/mL and the cobalt source solution has a concentration of 2-4 mg/mL; the concentration selections of the two solutions do not affect each other, which may be the same concentration or different concentrations. In the present application, the "independently" is construed in the similar way as used here.

In the present application, there is no limitation on the solvent for the rhodium source solution and the cobalt source solution, which may be, for example, water.

Preferably, a volume ratio of the rhodium source solution, to the cobalt source solution is (10-50):(10-20), wherein the selection range of "10-50" for the rhodium source solution may be, for example, 10, 20, 30, 40 or 50, and the selection range of "10-20" for the cobalt source solution may be, for example, 10, 12, 14, 16, 18, or 20. However, the volume ratio is not limited to the listed values, and other unlisted values within the numerical range are also applicable.

Preferably, the mixing in step (a) and the mixing in step (b) are accompanied by stirring.

Preferably, the mixing in step (a) is performed by:
dispersing polyhedron strontium titanate nanoparticles in water to obtain a dispersion solution, and mixing the dispersion solution with the rhodium source solution.

Preferably, the dispersion solution has a concentration of 0.5-2 mg/mL, which may be, for example, 0.5 mg/mL, 0.7 mg/mL, 0.9 mg/mL, 1 mg/mL, 1.5 mg/mL or 2 mg/mL. However, the concentration is not limited to the listed values, and other unlisted values within the numerical range are also applicable.

Preferably, the irradiation in step (a) and the irradiation in step (b) are performed with a xenon lamp as light source.

Preferably, the irradiation in step (a) and the irradiation in step (b) are independently performed for a period of 5-10 min, which may be, for example, 5 min, 6 min, 7 min, 8 min, 9 min or 10 min. However, the period is not limited to the listed values, and other unlisted values within the numerical range are also applicable.

Preferably, the heat treatment in step (c) comprises a primary heating and a secondary heating.

Preferably, the primary heating comprises water bath heating.

Preferably, the primary heating is performed at a temperature of 50-90° C., which may be, for example, 50° C., 60° C., 70° C., 80° C. or 90° C. However, the temperature is not limited to the listed values, and other unlisted values within the numerical range are also applicable.

Preferably, the secondary heating is performed in an air atmosphere.

Preferably, the secondary heating is performed at a temperature of 350-550° C., which may be, for example, 350° C., 400° C., 450° C., 500° C. or 550° C. However, the temperature is not limited to the listed values, and other unlisted values within the numerical range are also applicable.

Preferably, the secondary heating is performed for a period of 1-2 h, which may be, for example, 1 h, 1.2 h, 1.4 h, 1.6 h, 1.8 h or 2 h. However, the period is not limited to the listed values, and other unlisted values within the numerical range are also applicable.

In a second aspect, the present application provides a method for photovoltaic power generation, and the method employs the device for photovoltaic power generation as described in the first aspect;
wherein the method comprises the following steps:
(I) adding a raw material for photovoltaic power generation to the photovoltaic power generating reactor;
(II) energizing the external electric field system, whereby electrode plates are in an energized state; and
(III) reflecting sunlight onto the solar concentrating cone by the reflectors, concentrating sunlight, and then casting concentrated sunlight to the photovoltaic power generating reactor for photovoltaic power generation.

As a preferred technical solution of the present application, the raw material for photovoltaic power generation in step (I) comprises an ionic liquid and a photoelectric conversion material.

Preferably, the photoelectric conversion material in the raw material for photovoltaic power generation in step (I) has a concentration of 1-9000 mg/mL, which may be, for example, 1 mg/mL, 12 mg/mL, 140 mg/mL, 1600 mg/mL, 8800 mg/mL, or 9000 mg/mL. However, the concentration is not limited to the listed values, and other unlisted values within the numerical range are also applicable.

In the present application, if the concentration of the photoelectric conversion material is too low, fewer electrons can export, and the photoelectric conversion efficiency will be low; if the concentration of the photoelectric conversion material is too high, the electron-hole recombination rate will be high and the photoelectric conversion efficiency will be low.

Preferably, the ionic liquid in step (II) comprises any one or a combination of at least two of an imidazolium phosphate ionic liquid, an N-alkyl-N-methylpyrrolidine ionic liquid or a tetraethylammonium quaternary ammonium ionic liquid.

Preferably, the imidazolium phosphate ionic liquid comprises any one or a combination of at least two of 1-butyl-3-methylimidazolium dihydrogen phosphate, 1-ethyl-3-methylimidazolium diethyl phosphate or 1-butyl-3-methylimidazolium hexafluorophosphate.

The numerical ranges described in the present application comprise not only the point values listed above, but also any unlisted point values within the above numerical ranges. For the space limitation and concision reason, the specific point values included in the range will not be exhaustively enumerated in the present application.

Compared with the prior art, the present application has the beneficial effects below.

(1) In the present application, a device for concentrating photovoltaic power generation is designed by utilizing the design concept of light-concentrating power generation, which greatly improves the utilization efficiency and light intensity of sunlight and largely simplifies the photoelectric conversion interface and the reaction unit, and by using a photoelectric conversion material, the photoelectric conversion efficiency is significantly improved. The device is simple in construction, low in cost, suitable for a variety of terrains as well as a variety of sunlight conditions, and has the potential for industrialized application.

(2) The concentrating photovoltaic power generation, which employs the device for concentrating photovoltaic power generation provided by the present application, has a simple principle, a simple process, readily available raw materials, and a low cost.

(3) The device for concentrating photovoltaic power generation provided by the present application can achieve a photoelectric conversion efficiency of more than 35% under a 100-times concentrated light condition.

Reference list: 1—photovoltaic power generating reactor; 2—solar concentrating cone; 3—reflector; 4—external electric field system; 5—positive electric field metal plate; 6—negative electric field metal plate; 7—container with an opening at the top; 8—light-transmitting cover; 9—photoelectric conversion material; and 10—stirrer.

DETAILED DESCRIPTION

In the description of the present application, it should be understood that the orientations or positional relationships indicated by the terms "center", "lengthways", "crosswise", "over", "under", "front", "back", "left", "right", "vertical", "horizontal", "top", "bottom", "inner", "outer" and the like based on an orientation or a positional relationship shown in drawings, which are only used for conveniently describing the present application and simplifying the description, rather than indicating or implying that the device or unit referred to necessarily has a particular orientation or needs to be arranged and operated in a particular orientation, and thereby should not be construed as a limitation to the present application. In addition, the terms "primary", "secondary" and the like are only used for descriptive purposes, and should not be construed as indicating or implying relative importance, or indicating or implying the number of the technical feature referred to. Hence, a feature defined by "primary", "secondary" or the like may expressly or implicitly include one or more of the features. In the description of the present application, unless otherwise specified, "a plurality of" refers to two or more than two.

It is to be noted that, in the description of the present application, unless otherwise specified or defined particularly, the terms "arrange", "link" and "connect" should be understood in a broad sense; for example, there may be a fixed connection, a detachable connection, or an integral connection; there may be a mechanical connection or an electrical connection; and there may be a direct connection, an indirect connection through an intermediate medium, or an internal connection between two units. For those skilled in the art, specific meanings of the above terms in the present application can be understood based on specific situations.

The technical solutions of the present application are further described below in terms of embodiments in conjunction with the drawings.

Figure 1:
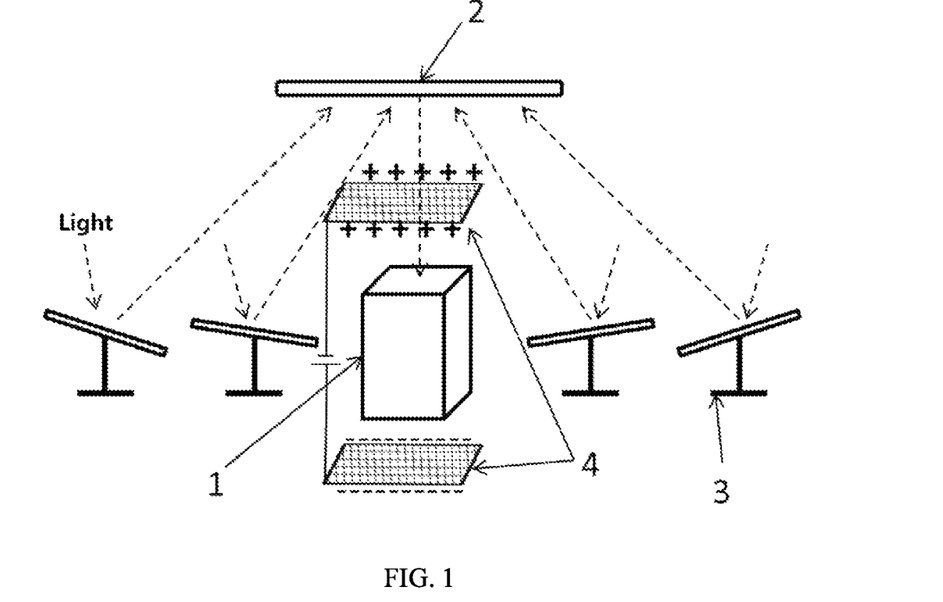
FIG. 1 is a schematic diagram showing a device for concentrating photovoltaic power generation provided in an embodiment of the present application.
Figure 2:
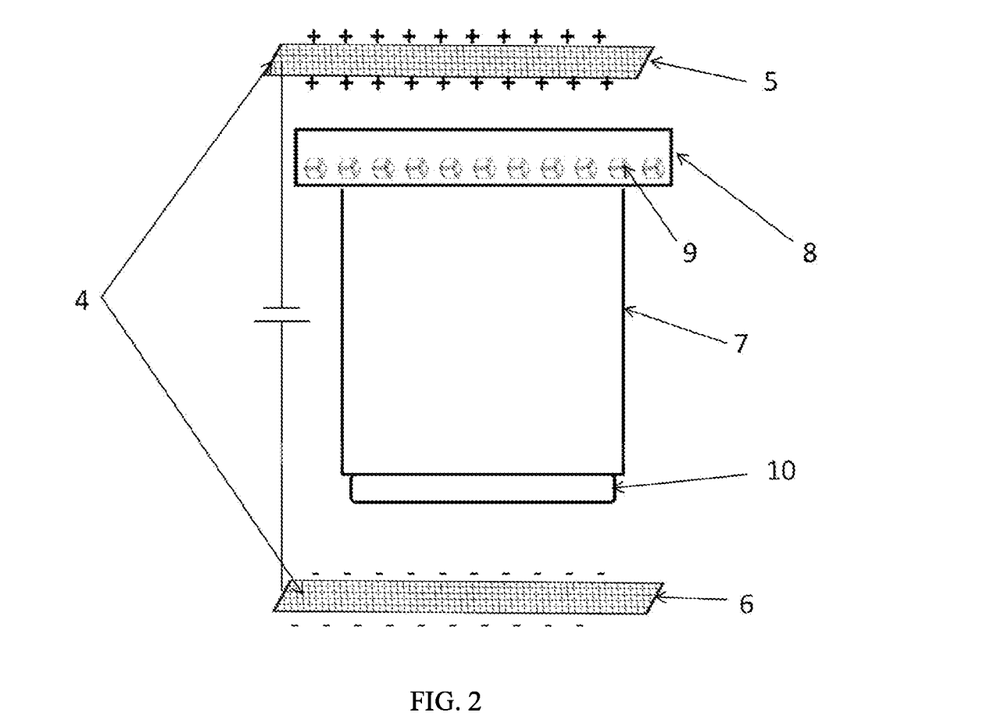
FIG. 2 is a schematic diagram showing a photovoltaic power generating reactor provided in an embodiment of the present application.

In an embodiment, the present application provides a device for photovoltaic power generation. As shown in FIG. 1, the device for photovoltaic power generation comprises a photovoltaic power generating reactor 1, a light condenser component, and an external electric field system 4; the photovoltaic power generating reactor 1 is shown in FIG. 2, and the light condenser component comprises a solar concentrating cone 2 and reflectors 3 which reflect sunlight onto the solar concentrating cone;

the solar concentrating cone 2 has a light-concentrating surface facing the light-transmitting surface of the photovoltaic power generating reactor 1;

the external electric field system 4 comprises a positive electric field metal plate 5 and a negative electric field metal plate 6, the positive electric field metal plate 5 is arranged between the photovoltaic power generating reactor 1 and the solar concentrating cone 2, and the negative electric field metal plate 6 is arranged at the bottom of the photovoltaic power generating reactor 1; and a photoelectric conversion material 9 is deposited inside the photovoltaic power generating reactor 1.

In the present application, a device for concentrating photovoltaic power generation is designed by utilizing the design concept of light-concentrating power generation, which greatly improves the utilization efficiency and light intensity of sunlight and largely simplifies the photoelectric conversion interface and the reaction unit, and by using a novel photoelectric conversion material 9, the photoelectric conversion efficiency is significantly improved. The device is simple in construction, low in cost, suitable for a variety of terrains as well as a variety of sunlight conditions, and has the potential for industrialized application.

In the present application, the external electric field system 4 is used for export of electrons to enhance the photoelectric conversion efficiency.

In the present application, there is no limitation on the material of the light condenser component; for example, the solar concentrating cone 2 may be made of aluminum boards, and the reflectors 3 may be made of aluminum boards. In the present application, there is no limitation on the source of the external electric field system 4, which may be a commercially available circuit system of solar photovoltaic cell.

In the present application, there is no limitation on the inner wall of the photovoltaic power generating reactor 1; for example, the inner wall of the photovoltaic power generating reactor 1 may be covered with an aluminum foil; there is no limitation on the size of the photovoltaic power generating reactor 1; for example, the photovoltaic power generating reactor 1 may be a reactor with a light-exposed area of 6×6 cm2 or a reactor with a diameter of 1-2 m.

Furthermore, the solar concentrating cone 2 is arranged directly above the photovoltaic power generating reactor 1.

Furthermore, the solar concentrating cone 2 is selected from a concentrating mirror.

Furthermore, a number of reflectors 3 is 10-100000, which may be, for example, 10, 100, 200, 300, 400, 500, 600, 700, 800, 900, 1000, 10000, 30000, 40000 or 100000. However, the number is not limited to the listed values, and other unlisted values within the numerical range are also applicable.

Furthermore, the reflectors 3 are evenly arranged around the photovoltaic power generating reactor 1.

In the present application, by arranging 10-100000 reflectors 3, the sunlight can be concentrated and reach 10-100000 times the standard solar irradiance in light intensity, which greatly improves the utilization efficiency and light intensity of sunlight and also largely simplifies the photoelectric conversion interface and the reaction unit, which is beneficial for efficient photoelectric conversion.

Furthermore, an applied voltage of the external electric field system 4 is 110-4000 V, which may be, for example, 110 V, 130 V, 150 V, 170 V, 190 V, 210 V, 220 V, 500 V, 1000 V, 2000 V, 3000 V or 4000 V, and preferably 110-220 V.

In the present application, the electric field intensity can be controlled by controlling the applied voltage of the electric field. If the applied voltage is too small, electrons will be difficult to export, and the photoelectric conversion efficiency will be low; if the applied voltage is too large, electrons and holes are prone to recombination, and the photoelectric conversion efficiency will be low.

Furthermore, materials of the positive electric field metal plate 5 and the negative electric field metal plate 6 are independently selected from any one of copper, steel or aluminum.

Furthermore, a ratio of a distance between the positive electric field metal plate 5 and a top surface of the photovoltaic power generating reactor 1 to a distance between the negative electric field metal plate 6 and a bottom surface of the photovoltaic power generating reactor 1 is 1:(1-3), which may be, for example, 1:1, 1:1.5, 1:2, 1:2.5 or 1:3.

Furthermore, the photovoltaic power generating reactor 1 has an integral structure, the photovoltaic conversion material 9 is inlaid on at least one side of inner walls of the photovoltaic power generating reactor 1, and preferably, the photovoltaic conversion material 9 is inlaid on the top of inner walls of the photovoltaic power generating reactor 1;

or, the photovoltaic power generating reactor 1 comprises a container 7 with an opening at the top and a light-transmitting cover 8 arranged at the opening, and the photovoltaic conversion material 9 is inlaid on at least one side of inner walls of the container or inlaid on an inner surface of the light-transmitting cover 8 close to the container.

Furthermore, a material of the light-transmitting cover 8 is quartz glass.

Furthermore, a stirrer 10 is arranged near the bottom of the photovoltaic power generating reactor 1.

Furthermore, the photoelectric conversion material 9 comprises a polyhedron strontium titanate catalyst and/or a polyhedron strontium titanate composite catalyst.

It is to be noted that the polyhedron strontium titanate catalyst is pure polyhedron strontium titanate without a co-catalyst, and the polyhedron strontium titanate composite catalyst is a composite of polyhedron strontium titanate and a co-catalyst.

In the present application, strontium titanate is a photocatalytic material with high temperature resistance and high ultraviolet absorption efficiency, having suitable band gap, valence band, and conduction band values. By loading the co-catalyst as active sites, the separation efficiency of photoelectrons and photoholes can be further improved, and the photoelectric conversion efficiency can be improved. Therefore, the use of polyhedron strontium titanate for photoelectric conversion can effectively improve the photoelectric conversion efficiency by fully utilizing the unique photoelectric conversion performance of polyhedron strontium titanate.

Furthermore, the polyhedron strontium titanate composite catalyst is loaded with a Rh metal compound and a Co metal compound as co-catalysts.

Furthermore, the polyhedron strontium titanate composite catalyst comprises an octadecahedron strontium titanate composite catalyst and/or a polyhedron strontium titanate composite catalyst having twenty-six faces.

Furthermore, a preparation method for the polyhedron strontium titanate composite catalyst comprises the following steps:

(1) mixing strontium titanate and strontium halide, and performing heat treatment to obtain a polyhedron strontium titanate catalyst; and (2) preparing polyhedron strontium titanate and its composite catalyst by a stepwise photodeposition method, wherein the stepwise photodeposition method comprises the following specific steps:
  (a) mixing a rhodium source solution and the polyhedron strontium titanate catalyst, and performing irradiation to obtain a first mixture;
  (b) mixing a cobalt source solution and the first mixture, and performing irradiation to obtain a second mixture; and
  (c) performing heat treatment on the second mixture to obtain the polyhedron strontium titanate and its composite catalyst.

Furthermore, a mass ratio of the strontium titanate to the strontium halide in step (1) is 1:(2-6), which may be, for example, 1:2, 1:2.5, 1:3, 1:3.5, 1:4, 1:4.5, 1:5, 1:5.5 or 1:6. However, the mass ratio is not limited to the listed values, and other unlisted values within the numerical range are also applicable.

In the present application, if the mass ratio of strontium titanate to strontium halide is too small, i.e., the amount of strontium halide is too large, the obtained polyhedron strontium titanate will have an ununiform particle size distribution and an irregular morphology; if the mass ratio of strontium titanate to strontium halide is too large, i.e., the amount of strontium halide is too small, the polyhedron strontium titanate will have a low conversion rate and an irregular morphology.

Furthermore, the strontium halide in step (1) comprises any one or a combination of at least two of strontium chloride, strontium bromide or strontium iodide.

Furthermore, the heat treatment in step (1) is performed at a temperature of 800-1200° C., which may be, for example, 800° C., 850° C., 900° C., 950° C., 1000° C., 1050° C., 1100° C., 1150° C. or 1200° C. However, the temperature is not limited to the listed values, and other unlisted values within the numerical range are also applicable.

Furthermore, the heat treatment in step (1) is performed for a period of 5-10 h, which may be, for example, 5 h, 6 h, 7 h, 8 h, 9 h or 10 h. However, the period is not limited to the listed values, and other unlisted values within the numerical range are also applicable.

Furthermore, a rhodium source of the rhodium source solution in step (a) comprises rhodium chloride.

Furthermore, a cobalt source of the cobalt source solution in step (b) comprises cobalt nitrate.

Furthermore, concentrations of the rhodium source solution and the cobalt source solution are independently 2-4 mg/mL, which may be, for example, 2 mg/mL, 2.2 mg/mL, 2.4 mg/mL, 2.6 mg/mL, 2.8 mg/mL, 3 mg/mL, 3.2 mg/mL, 3.4 mg/mL, 3.6 mg/mL, 3.8 mg/mL or 4 mg/mL. However, the concentration is not limited to the listed values, and other unlisted values within the numerical range are also applicable.

It is to be noted that, in the present application, the "independently" means that the rhodium source solution has a concentration of 2-4 mg/mL and the cobalt source solution has a concentration of 2-4 mg/mL; the concentration selections of the two solutions do not affect each other, which may be the same concentration or different concentrations. In the present application, the "independently" is construed in the similar way as used here.

In the present application, there is no limitation on the solvent for the rhodium source solution and the cobalt source solution, which may be, for example, water.

Furthermore, a volume ratio of the rhodium source solution to the cobalt source solution is (10-50):(10-20), wherein the selection range of "10-50" for the rhodium source solution may be, for example, 10, 20, 30, 40 or 50, and the selection range of "10-20" for the cobalt source solution may be, for example, 10, 12, 14, 16, 18, or 20. However, the volume ratio is not limited to the listed values, and other unlisted values within the numerical range are also applicable.

Furthermore, the mixing in step (a) and the mixing in step (b) are accompanied by stirring.

Furthermore, the mixing in step (a) is performed by:
  dispersing polyhedron strontium titanate nanoparticles in water to obtain a dispersion solution, and mixing the dispersion solution with the rhodium source solution.

Furthermore, the dispersion solution has a concentration of 0.5-2 mg/mL, which may be, for example, 0.5 mg/mL, 0.7 mg/mL, 0.9 mg/mL, 1 mg/mL, 1.5 mg/mL or 2 mg/mL. However, the concentration is not limited to the listed values, and other unlisted values within the numerical range are also applicable.

Furthermore, the irradiation in step (a) and the irradiation in step (b) are performed with a xenon lamp as light source.

Furthermore, the irradiation in step (a) and the irradiation in step (b) are independently performed for a period of 5-10 min, which may be, for example, 5 min, 6 min, 7 min, 8 min, 9 min or 10 min. However, the period is not limited to the listed values, and other unlisted values within the numerical range are also applicable.

Furthermore, the heat treatment in step (c) comprises a primary heating and a secondary heating.

Furthermore, the primary heating comprises water bath heating.

Furthermore, the primary heating is performed at a temperature of 50-90° C., which may be, for example, 50° C., 60° C., 70° C., 80° C. or 90° C. However, the temperature is not limited to the listed values, and other unlisted values within the numerical range are also applicable.

Furthermore, the secondary heating is performed in an air atmosphere.

Furthermore, the secondary heating is performed at a temperature of 350-550° C., which may be, for example, 350° C., 400° C., 450° C., 500° C. or 550° C. However, the temperature is not limited to the listed values, and other unlisted values within the numerical range are also applicable.

Furthermore, the secondary heating is performed for a period of 1-2 h, which may be, for example, 1 h, 1.2 h, 1.4 h, 1.6 h, 1.8 h or 2 h. However, the period is not limited to the listed values, and other unlisted values within the numerical range are also applicable.

In another embodiment, the present application provides a method for photovoltaic power generation, and the method employs the device for photovoltaic power generation as described in the first aspect;
  the method comprises the following steps:
  (I) adding a raw material for photovoltaic power generation to the photovoltaic power generating reactor 1;
  (II) energizing the external electric field system 4, whereby electrode plates are in an energized state; and
  (III) reflecting sunlight onto the solar concentrating cone 2 by the reflectors 3, concentrating sunlight, and then casting concentrated sunlight to the photovoltaic power generating reactor 1 for photovoltaic power generation.

Example 1

This example provides a method for photovoltaic power generation, and the method comprises the following steps:

(1) an octadecahedron strontium titanate composite catalyst was prepared according to the specific steps as follows:
(a) strontium titanate and strontium chloride were mixed at a molar ratio of 1:4 and subjected to heat treatment at 1000° C. for 7.5 h to obtain an octadecahedron strontium titanate catalyst; and
(b) the octadecahedron strontium titanate catalyst was dispersed in water to obtain a dispersion solution with a concentration of 1 mg/mL, the dispersion solution and a rhodium chloride solution with a concentration of 3 mg/mL were mixed and stirred, and irradiated with a xenon lamp for 7.5 min to obtain a first mixture; a cobalt nitrate solution with a concentration of 3 mg/mL and the first mixture were mixed and stirred, and irradiated with a xenon lamp for 7.5 min to obtain a second mixture; the second mixture is heated at 80° C. by a water bath, and then heated at 450° C. in an air atmosphere for 1.5 h, so as to obtain the octadecahedron strontium titanate composite catalyst;
in step (b), a volume ratio of the rhodium chloride solution to the cobalt nitrate solution was 30:15;
(2) an ionic liquid and the octadecahedron strontium titanate composite catalyst were added to the photovoltaic power generating reactor;
in step (2), the ionic liquid was 1-butyl-3-methylimidazolium dihydrogen phosphate and a concentration of the octadecahedron strontium titanate composite catalyst was 1.5 mg/ml;
(3) the external electric field system was energized, whereby electrode plates were in an energized state;
(4) sunlight was reflected by 500 reflectors onto the solar concentrating cone, concentrated and cast to the photovoltaic power generating reactor for photovoltaic power generation;
in step (3), an applied voltage of the external electric field system was 150 V.

Example 2

This example provides a method for photovoltaic power generation, and the method comprises the following steps:
(1) a polyhedron strontium titanate composite catalyst having twenty-six faces was prepared according to the specific steps as follows:
(a) strontium titanate and strontium bromide were mixed at a molar ratio of 1:2 and subjected to heat treatment at 800° C. for 10 h to obtain a polyhedron strontium titanate catalyst having twenty-six faces; and
(b) the polyhedron strontium titanate catalyst having twenty-six faces was dispersed in water to obtain a dispersion solution with a concentration of 0.5 mg/mL, the dispersion solution and a rhodium chloride solution with a concentration of 2 mg/mL were mixed and stirred, and irradiated with a xenon lamp for 5 min to obtain a first mixture; a cobalt nitrate solution with a concentration of 2 mg/mL and the first mixture were mixed and stirred, and irradiated with a xenon lamp for 5 min to obtain a second mixture; the second mixture is heated at 90° C. by a water bath, and then heated at 350° C. in an air atmosphere for 2 h, so as to obtain the polyhedron strontium titanate composite catalyst having twenty-six faces;
in step (b), a volume ratio of the rhodium chloride solution to the cobalt nitrate solution was 10:20;
(2) an ionic liquid and the polyhedron strontium titanate composite catalyst having twenty-six faces were added to the photovoltaic power generating reactor;
in step (2), the ionic liquid was 1-ethyl-3-methylimidazolium diethyl phosphate and a concentration of the polyhedron strontium titanate composite catalyst having twenty-six faces was 2 mg/mL;
(3) the external electric field system was energized, whereby electrode plates were in an energized state;
(4) sunlight was reflected by 1000 reflectors onto the solar concentrating cone, concentrated and cast to the photovoltaic power generating reactor for photovoltaic power generation;
in step (3), an applied voltage of the external electric field system was 220 V.

Example 3

This example provides a method for photovoltaic power generation, and the method comprises the following steps:
(1) an octadecahedron strontium titanate composite catalyst was prepared according to the specific steps as follows:
(a) strontium titanate and strontium iodide were mixed at a molar ratio of 1:6 and subjected to heat treatment at 1200° C. for 5 h to obtain an octadecahedron strontium titanate catalyst; and
(b) the octadecahedron strontium titanate catalyst was dispersed in water to obtain a dispersion solution with a concentration of 2 mg/mL, the dispersion solution and a rhodium chloride solution with a concentration of 4 mg/mL were mixed and stirred, and irradiated with a xenon lamp for 10 min to obtain a first mixture; a cobalt nitrate solution with a concentration of 4 mg/mL and the first mixture were mixed and stirred, and irradiated with a xenon lamp for 10 min to obtain a second mixture; the second mixture is heated at 90° C. by a water bath, and then heated at 550° C. in an air atmosphere for 1 h, so as to obtain the octadecahedron strontium titanate composite catalyst;
in step (b), a volume ratio of the rhodium chloride solution to the cobalt nitrate solution was 50:10;
(2) an ionic liquid and the octadecahedron strontium titanate composite catalyst were added to the photovoltaic power generating reactor;
in step (2), the ionic liquid was 1-butyl-3-methylimidazolium hexafluorophosphate and a concentration of the octadecahedron strontium titanate composite catalyst was 1 mg/mL;
(3) the external electric field system was energized, whereby electrode plates were in an energized state;
(4) sunlight was reflected by 100 reflectors onto the solar concentrating cone, concentrated and cast to the photovoltaic power generating reactor for photovoltaic power generation;
in step (3), an applied voltage of the external electric field system was 110 V.

Example 4

This example differs from Example 1 in that the octadecahedron strontium titanate was used as the photoelectric conversion material in this example, i.e., step (b) was not performed.
The rest of the preparation method and parameters are the same as in Example 1.

Example 5

This example differs from Example 1 in that the mass ratio of strontium titanate to strontium chloride in step (a) was 1:1.

The rest of the preparation method and parameters are the same as in Example 1.

Example 6

This example differs from Example 1 in that the mass ratio of strontium titanate to strontium chloride in step (a) was 1:8.

The rest of the preparation method and parameters are the same as in Example 1.

Example 7

This example differs from Example 1 in that the concentration of the octadecahedron strontium titanate composite catalyst in step (2) was 0.5 mg/mL.

The rest of the preparation method and parameters are the same as in Example 1.

Example 8

This example differs from Example 1 in that the concentration of the octadecahedron strontium titanate composite catalyst in step (2) is 2.5 mg/mL.

The rest of the preparation method and parameters are the same as in Example 1.

Example 9

This example differs from Example 1 in that an applied voltage of the external electric field system in step (3) was 80 V.

The rest of the preparation method and parameters are the same as in Example 1.

Example 10

This example differs from Example 1 in that an applied voltage of the external electric field system in step (3) was 250 V.

The rest of the preparation method and parameters are the same as in Example 1.

Comparative Example 1

This comparative example differs from Example 1 in that the light condenser component did not contain a reflector.

The rest of the preparation method and parameters are the same as in Example 1.

Comparative Example 2

This comparative example differs from Example 1 in that the inner wall of the photovoltaic power generating reactor had no octadecahedron strontium titanate composite catalyst inlaid.

The rest of the preparation method and parameters are the same as in Example 1.

Comparative Example 3

This comparative example differs from Example 1 in that the light condenser component was replaced with a concentrator lens.

The rest of the preparation method and parameters are the same as in Example 1.

Performance Test

The devices for photovoltaic power generation provided in Examples 1-10 and Comparative Examples 1-3 were tested for photovoltaic performance, and the testing method comprises:

in the photovoltaic power generating reactor, electrode plates were inserted on the upper and lower positions of the reaction solution as the positive and negative electrodes for the photovoltaic power generation module, and the photovoltaic power generation module was connected to an external solar cell J-V curve testing instrument by external wires to detect current and voltage; the light intensity of light spot was determined using a light intensity meter; and the two were combined to test the photoelectric conversion efficiency of the device for photovoltaic power generation.

The test results of photoelectric conversion efficiency are shown in Table 1.

TABLE 1

|  | Photoelectric conversion efficiency (%) |
|---|---|
| Example 1 | 35 |
| Example 2 | 45 |
| Example 3 | 30 |
| Example 4 | 15 |
| Example 5 | 19 |
| Example 6 | 18 |
| Example 7 | 22 |
| Example 8 | 20 |
| Example 9 | 9 |
| Example 10 | 17 |
| Comparative Example 1 | 6 |
| Comparative Example 2 | 30 |
| Comparative Example 3 | 7 |

Analysis:

As can be seen from the table, the device for concentrating photovoltaic power generation designed by the present application greatly improves the utilization efficiency and light intensity of sunlight and largely simplifies the photoelectric conversion interface and the reaction unit, and by using a photoelectric conversion material, the photoelectric conversion efficiency is significantly improved. The device is simple in construction, low in cost, suitable for a variety of terrains as well as a variety of sunlight conditions, and has the potential for industrialized application.

As can be seen from the data comparison between Example 1 and Example 4, the photoelectric conversion efficiency is reduced by more than 50% when the octadecahedron strontium titanate catalyst is used as the photoelectric conversion material.

As can be seen from the data comparison between Example 1 and Examples 5-6, when the mass ratio of strontium titanate to strontium chloride is too large, i.e., the amount of strontium chloride is too small, the photoelectric conversion efficiency is significantly reduced; when the mass ratio of strontium titanate to strontium chloride is too small, i.e., the amount of strontium chloride is too much, the photoelectric conversion efficiency is significantly reduced.

As can be seen from the data comparison between Example 1 and Examples 7-8, when the concentration of the octadecahedron strontium titanate composite catalyst is too low, fewer electrons can export, and the photoelectric conversion efficiency is significantly reduced; when the concentration of the octadecahedron strontium titanate composite catalyst is too high, the electron-hole recombination rate is high and the photoelectric conversion efficiency is significantly reduced.

As can be seen from the data comparison between Example 1 and Examples 9-10, when the applied voltage of the external electric field system is too low, the photoelectric conversion efficiency is significantly reduced; when the applied voltage of the external electric field system is too high, the photoelectric conversion efficiency is reduced.

As can be seen from the data comparison between Example 1 and Comparative Example 1, when the light condenser component does not contain a reflector, the reactor only receives "one" sunlight, and thus the photoelectric conversion efficiency is significantly reduced.

As can be seen from the data comparison between Example 1 and Comparative Example 2, when the inner wall of the photovoltaic power generating reactor has no octa-decahedron strontium titanate composite catalyst inlaid, the inner wall space of the reactor cannot be fully utilized, and thus the photoelectric conversion efficiency is reduced.

As can be seen from the data comparison between Example 1 and Comparative Example 3, when the light condenser component is replaced with a concentrator lens, the reactor only receives "one" sunlight, and thus the photoelectric conversion efficiency is significantly reduced.

The applicant has stated that although the process method of the present application is described through the examples described above, the present application is not limited to the processes and steps described above, which means that the implementation of the present application does not necessarily depend on the processes and steps described above. It should be apparent to those skilled in the art that any improvements made to the present application, equivalent replacements of raw materials selected in the present application, the addition of adjuvant ingredients thereof, selections of specific methods, etc., shall all fall within the protection scope and disclosed scope of the present application.

What is claimed is:

1. A method for photovoltaic power generation, wherein a device for photovoltaic power generation used in the method comprises a photovoltaic power generating reactor comprising a light-transmitting surface, a light condenser component and an external electric field system;
    wherein the light condenser component comprises a solar concentrating cone and a reflector for reflecting sunlight onto the solar concentrating cone;
    the solar concentrating cone has a light-concentrating surface facing the light-transmitting surface of the photovoltaic power generating reactor;
    the external electric field system comprises a positive electric field metal plate and a negative electric field metal plate, the positive electric field metal plate is arranged between the photovoltaic power generating reactor and the solar concentrating cone, and the negative electric field metal plate is arranged at the bottom of the photovoltaic power generating reactor;
    the photovoltaic power generating reactor comprises a container with an opening at the top and a light-transmitting cover arranged at the opening, and a photovoltaic conversion material is inlaid on at least one side of inner walls of the container or inlaid on an inner surface of the light transmitting cover close to the container;
    the photoelectric conversion material is a polyhedron strontium titanate composite catalyst;
    the polyhedron strontium titanate composite catalyst is loaded with a Rh metal compound and a Co metal compound as co-catalysts;
    wherein a preparation method for the polyhedron strontium titanate composite catalyst comprises the following steps:
    (1) mixing strontium titanate and strontium halide, and performing heat treatment to obtain a polyhedron strontium titanate catalyst; and
    (2) preparing the polyhedron strontium titanate composite catalyst by a stepwise photodeposition method, wherein the stepwise photodeposition method comprises the following specific steps:
    (a) mixing a rhodium source solution and the polyhedron strontium titanate catalyst, and performing irradiation to obtain a first mixture;
    (b) mixing a cobalt source solution and the first mixture, and performing irradiation to obtain a second mixture; and
    (c) performing heat treatment on the second mixture to obtain the polyhedron strontium titanate composite catalyst;
    wherein a mass ratio of the strontium titanate to the strontium halide in step (1) is 1:(2-6);
    wherein the method comprises the following steps:
    (I) adding a raw material for photovoltaic power generation to the photovoltaic power generating reactor;
    (II) energizing the external electric field system, whereby electrode plates are in an energized state; and
    (III) reflecting sunlight onto the solar concentrating cone by the reflector, concentrating sunlight, and then casting concentrated sunlight to the photovoltaic power generating reactor for photovoltaic power generation;
    wherein the raw material for photovoltaic power generation in step (I) comprises an ionic liquid and a photoelectric conversion material; and the photoelectric conversion material has a concentration of 1-2 mg/mL.

2. The method according to claim 1, wherein the solar concentrating cone is arranged directly above the photovoltaic power generating reactor;
    the solar concentrating cone is selected from any one of concentrating mirrors;
    a number of reflectors is 10-100000; and
    the reflectors are evenly arranged around the photovoltaic power generating reactor.

3. The method according to claim 1, wherein an applied voltage of the external electric field system is 110-4000 V;
    wherein materials of the positive electric field metal plate and the negative electric field metal plate are independently selected from any one of copper, steel or aluminum; and
    a ratio of a distance between the positive electric field metal plate and a top surface of the photovoltaic power generating reactor to a distance between the negative electric field metal plate and a bottom surface of the photovoltaic power generating reactor is 1:(1-3).

4. The method according to claim 1, wherein a material of the light-transmitting cover is quartz glass;
    wherein a stirrer is arranged near the bottom of the photovoltaic power generating reactor.

5. The method according to claim 1, wherein the strontium halide in step (1) comprises any one or a combination of at least two of strontium chloride, strontium bromide or strontium iodide;
    wherein the heat treatment in step (1) is performed at 800-1200° C.; and
    the heat treatment in step (1) is performed for 5-10 h.

6. The method according to claim 1, wherein a rhodium source of the rhodium source solution in step (a) comprises rhodium chloride;
- wherein a cobalt source of the cobalt source solution in step (b) comprises cobalt nitrate;
- concentrations of the rhodium source solution and the cobalt source solution are independently 2-4 mg/mL;
- a volume ratio of the rhodium source solution to the cobalt source solution is (10-50):(10-20);
- the mixing in step (a) and the mixing in step (b) are accompanied by stirring;
- the mixing in step (a) is performed by:
- dispersing polyhedron strontium titanate nanoparticles in water to obtain a dispersion solution, and mixing the dispersion solution with the rhodium source solution;
- wherein the dispersion solution has a concentration of 0.5-2 mg/mL;
- the irradiation in step (a) and the irradiation in step (b) are performed with a xenon lamp as light source;
- the irradiation in step (a) and the irradiation in step (b) are independently performed for 5-10 min;
- the heat treatment in step (c) comprises a primary heating and a secondary heating;
- the primary heating comprises water bath heating;
- the primary heating is performed at 50-90° C.;
- the secondary heating is performed in an air atmosphere;
- the secondary heating is performed at 350-550° C.; and
- the secondary heating is performed for 1-2 h.

7. The method according to claim 1, wherein the ionic liquid in step (I) comprises any one or a combination of at least two of an imidazolium phosphate ionic liquid, an N-alkyl-N-methylpyrrolidine ionic liquid or a tetraethylammonium quaternary ammonium ionic liquid;
- wherein the imidazolium phosphate ionic liquid comprises any one or a combination of at least two of 1-butyl-3-methylimidazolium dihydrogen phosphate, 1-ethyl-3-methylimidazolium diethyl phosphate or 1-butyl-3-methylimidazolium hexafluorophosphate.

\* \* \* \* \*